United States Patent Office 3,013,080
Patented Dec. 12, 1961

3,013,080
COMPLEX OF VITAMIN A ALDEHYDE
Charles H. Benton, Jr., Rochester, N.Y., assignor to Eastman Kodak Company, Rochester, N.Y., a corporation of New Jersey
No Drawing. Filed Oct. 15, 1959, Ser. No. 846,564
1 Claim. (Cl. 260—592)

This invention concerns a vitamin A material, and more particularly, a new crystallizable complex of vitamin A aldehyde.

Vitamin A aldehyde has the following structural formula

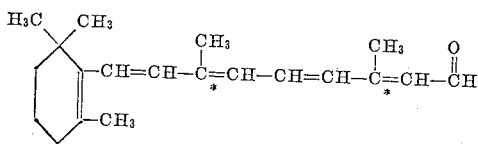

Vitamin A aldehyde exists in the form of various geometric isomers having cis and trans configurations in the 2 and 6 positions starred in the structural formula above. Of the various isomers, the 2,6-trans,trans isomer forms crystallizable complexes with certain specific phenolic or hydroxybenzene compounds. Complexes of phenolic materials and 2,6-trans,trans vitamin A aldehyde are useful in that they can be used to selectively separate the 2,6-trans,trans isomer from other geometrical isomers of vitamin A aldehyde, the 2,6-trans,trans isomer having the highest vitamin A biological activity and being the more usually desired isomer. In addition, such vitamin A aldehyde complexes provide a useful form of solid crystalline vitamin A material that has good stability to oxidative deterioration.

It is an object of this invention to provide a new crystallizable complex of 2,6-trans,trans vitamin A aldehyde and a phenolic material.

It is a further object of this invention to selectively separate 2,6-trans,trans vitamin A aldehyde from an admixture containing one or more of the cis isomeric forms of vitamin A aldehyde by a novel method.

It is still another object of this invention to provide a new complex of 2,6-trans,trans vitamin A aldehyde from which 2,6-trans,trans vitamin A aldehyde can be readily regenerated.

It is another object of this invention to provide a novel crystallizable complex consisting of 2,6-trans,trans vitamin A aldehyde and a phenolic compound containing an electron withdrawing group.

These and other objects of the invention are attained by means of this invention as described more fully hereinafter with particular reference to preferred embodiments thereof.

I have discovered that 2,4,5-trihydroxy-n-butyrophenone selectively forms a complex with 2,6-trans,trans vitamin A aldehyde but does not form crystallizable complexes with other isomeric forms of vitamin A aldehyde such as the cis,cis form; the cis,trans form; or, the trans,cis form. The present complex consists of one molar proportion of 2,4,5-trihydroxy-n-butyrophenone and one molar proportion of 2,6-trans,trans vitamin A aldehyde.

Vitamin A aldehyde is a well-known material and can exist as one of several isomers or admixtures thereof as pointed out above. Any vitamin A aldehyde composition containing the 2,6-trans,trans isomer of vitamin A aldehyde, sometimes called "retinene" or "all trans vitamin A aldehyde," can be used to prepare the complex of the invention. Reference is made to the article by Robeson, Blum, Dieterle, Cawley and Baxter, Journal of American Chemical Society 77, pages 4120–4125 (1955), wherein is described the various geometrical isomers of vitamin A aldehyde and their methods of preparation. Herein I have referred to the trans as well as the cis isomeric configurations of vitamin A aldehyde in my nomenclature. Some workers in this art have used other nomenclature wherein only the cis configurations are specifically designated.

The 2,4,5-trihydroxy-n-butyrophenone portion of the subject complex can be prepared by the method described in Knowles and Tholstrup U.S. Patent No. 2,759,828 dated August 21, 1956. This phenolic compound has the following structural formula

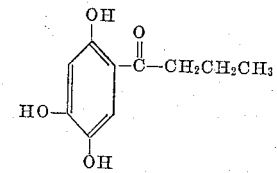

The present complex is readily formed by admixing or associating 2,4,5-trihydroxy-n-butyrophenone and 2,6-trans,trans vitamin A aldehyde in solution, generally in an inert organic solvent. Either polar or non-polar solvents can be utilized in preparing the complex of the invention, typical suitable inert organic solvents include petroleum ethers, hexane or a similar low boiling petroleum-derived fraction, diethyl ether, methanol, ethanol, benzene, toluene or the like. The complex can also be formed by merely adding the 2,4,5-trihydroxybutyrophenone directly to a liquid mixture containing 2,6-trans, trans vitamin A aldehyde if the 2,4,5-trihydroxy-n-butyrophenone is soluble in the mixture under the conditions of addition. The complex can be conveniently formed at room temperature, although slightly elevated temperatures such as about 40° C. to 100° C. or up to the reflux temperature of the solvent are often times desirably utilized to dissolve the components of the complex. The molar proportions of 2,4,5-trihydroxy-n-butyrophenone and 2,6-trans,trans vitamin A aldehyde in the complexing mixture can be widely varied, a complex consisting of one molar proportion of 2,4,5-trihydroxy-n-butyrophenone and one molar proportion of 2,6-trans,trans vitamin A aldehyde resulting regardless of the molar proportions of the respective complexing components initially present in the complexing or "reaction" mixture.

The complex formed in accordance with the invention can be conveniently separated from the resulting mixture by crystallization and filtration. The separation is readily accomplished because the properties of the complex differ substantially from any uncomplexed cis isomers of vitamin A aldehyde that may be in the reaction mixture. The present complex can be easily separated by crystallization because of its relatively low solubility in inert organic solvents. The separation is thus readily accomplished by cooling and concentrating the reaction mixture to cause fractional crystallization of the complex. With solvents such as petroleum ether, diethyl ether, or the like, crystallization occurs readily at room temperature, although lower temperatures can be used if desired. Alternatively, the entire complexing mixture can be dried and any uncomplexed cis isomers of vitamin A aldehyde leached out of the resulting solid residue with an inert organic solvent.

The present complex can be readily converted or regenerated in unchanged form to 2,6-trans,trans vitamin A aldehyde and 2,4,5-trihydroxy-n-butyrophenone by merely washing with aqueous alkali such as with aqueous solutions of sodium or potassium hydroxide.

The crystalline complex of the invention has good stability to oxidative deterioration as compared to the relatively labile vitamin A aldehyde and can be utilized as the vitamin A material in a wide variety of medicinal compositions as well as for fortifying animal feeds. Typical carriers for the vitamin A-active complex of the invention include gelatin, pectin, gun arabic, mineral waxes, vegetable waxes, sugars, high melting fatty materials such as beef tallow and monostearin, and other well-known vitamin carriers. Such compositions can be in a wide variety of forms such as powders, flakes, beadlets, pellets, pills, capsules, and the like.

Whether or not a particular phenolic material will form a crystallizable complex with 2,6-trans,trans vitamin A aldehyde is highly unpredictable. Often times homologues or isomers or other closely related phenolic compounds have opposite properties with respect to ability to complex with 2,6-trans,trans vitamin A aldehyde. I have found that several phenolic materials closely related to 2,4,5-trihydroxy-n-butyrophenone, including 2,4,5-trihydroxyacetophenone, do not complex with 2,6-trans,trans vitamin A aldehyde. Another surprising aspect of the present complex is the fact that the phenolic component thereof contains an electron withdrawing group, namely, the butyryl group. Such electron withdrawing phenolic compounds have not heretofore been associated with the formation of the present type of vitamin A aldehyde complex. The phenolic compounds described in the prior art as forming crystallizable complexes with 2,6-trans,trans vitamin A aldehyde have been electron "rich" compounds, and such electron "rich" compounds formed complexes with the electron "deficient" vitamin A aldehyde molecule. Hence, it was unexpected when I found that 2,4,5-trihydroxy-n-butyrophenone forms a crystallizable complex with 2,6-trans,trans vitamin A aldehyde.

The invention is further illustrated by the following examples of preferred embodiments thereof. The ultraviolet data set out in the following examples were determined on ethanol solutions of the respective compositions.

*Example 1*

(a) To a solution of 3.0 g. of 2,4,5-trihydroxy-n-butyrophenone in 100 ml. of isopropyl ether was added a solution of 4.3 g. of mixed isomers of vitamin A aldehyde containing the 2,6-trans,trans isomer; the 2,6-cis,cis isomer; the 2-cis, 6-trans isomer and the 2-trans, 6-cis isomer; and having $$E^{1\%}_{1\ cm.}\ (375\ m\mu) = 921$$

dissolved in 10 ml. of isopropyl ether. The resulting solution was evaporated to about 15 ml. under a stream of nitrogen on a steam bath, cooled to $-20°$ C. and the glass flask containing the composition scratched with a glass rod. After 17 hours, the crystalline product was separated by filtration, washed with cold isopropyl ether and dried. The resulting yellow crystalline product weighed 2.6 g. and had $$E^{1\%}_{1\ cm.}\ (374\ m\mu) = 829$$

this product being a complex consisting of one molar proportion of 2,6-trans,trans vitamin A aldehyde and one molar proportion of 2,4,5-trihydroxy-n-butyrophenone.

(b) The prepared complex can be regenerated into 2,6-trans,trans vitamin A aldehyde.

One gram of the prepared complex was dissolved in diethyl ether, washed four times with 50 ml. portions of N/2 potassium hydroxide, once with water, dried over sodium sulfate, filtered and the diethyl ether solvent evaporated to give crystalline 2,6-trans,trans vitamin A aldehyde having $$E^{1\%}_{1\ cm.}\ (381\ m\mu) = 1355$$

*Example 2*

Methanol was employed in lieu of isopropyl ether in the process described in Example 1(a) above. A complex consisting of one molar proportion of 2,6-trans,trans vitamin A aldehyde and one molar proportion of 2,4,5-trihydroxy-n-butyrophenone resulted. When treated with aqueous potassium hydroxide, the complex decomposed to regenerate 2,6-trans,trans vitamin A aldehyde.

*Example 3*

An equimolar mixture of 2,6-trans,trans vitamin A aldehyde and 2,4,5-trihydroxy-n-butyrophenone was dissolved on a steam bath in a minimum of diethyl ether. Thereafter, a low boiling petroleum ether (B.P. 40–60° C.) was added until the solution was saturated. The solution was cooled to $-20°$ C. and the resulting crystalline precipitate was separated by filtration, washed on the filter with more cold petroleum ether and dried. The resulting material was recrystallized from isopropyl ether to yield a complex consisting of one molar proportion of 2,6-trans,trans vitamin A aldehyde and one molar proportion of 2,4,5-trihydroxy-n-butyrophenone. The complex melted at 88.2° C., had $$E^{1\%}_{1\ cm.}\ 372(\ m\mu) = 864$$

and had a carbon-hydrogen analysis of C=75.0%, H=8.6% (calculated analysis, C=74.97%, H=8.39%).

*Example 4*

Several phenolic compounds were substituted for the 2,4,5-trihydroxy-n-butyrophenone in the processes described in Examples 1 to 3 and no crystallizable complexes of the phenolic compounds and 2,6-trans,trans vitamin A aldehyde resulted. The following compounds did not form crystallizable complexes with 2,6-trans,trans vitamin A aldehyde:

(a) 2,4,5-trihydroxyacetophenone
(b) 2,5-dihydroxyacetophenone
(c) 1,2,3-trihydroxybenzene
(d) Propyl gallate
(e) 2,4-dihydroxybenzaldehyde
(f) p-Hydroxybenzoic acid
(g) p-Nitrophenol Thus, several phenolic compounds closely related to the present 2,4,5 - trihydroxy-n-butyrophenone complexing agent do not have such complexing properties.

Thus, by means of this invention, 2,6-trans,trans vitamin A aldehyde can be readily separated from closely related isomers of vitamin A aldehyde having less vitamin A biological activity. The present complex is obtained in crystalline form and 2,6-trans,trans vitamin A aldehyde can be readily regenerated from this complex by washing with aqueous alkali. In addition, the present complex can be added to various compositions as such to serve as a source of vitamin A material.

Although the invention has been described in detail with reference to certain preferred embodiments thereof, it will be understood that variations and modifications can be effected within the spirit and scope of the invention as described hereinabove and as defined in the appended claim.

I claim:

A crystallizable complex consisting on one molar proportion of 2,6-trans,trans vitamin A aldehyde and one molar proportion of 2,4,5-trihydroxy-n-butyrophenone.

References Cited in the file of this patent

UNITED STATES PATENTS

| | | |
|---|---|---|
| 2,683,746 | Benton et al. | July 13, 1954 |
| 2,683,747 | Benton et al. | July 13, 1954 |
| 2,765,343 | Benton et al. | Oct. 2, 1956 |
| 2,765,344 | Benton et al. | Oct. 2, 1956 |
| 2,835,679 | Benton et al. | May 20, 1958 |